(12) United States Patent
Weng et al.

(10) Patent No.: US 11,726,390 B2
(45) Date of Patent: Aug. 15, 2023

(54) OPTICAL ELEMENT DRIVING MECHANISM

(71) Applicant: TDK TAIWAN CORP., Taoyuan (TW)

(72) Inventors: Chih-Wei Weng, Taoyuan (TW);
Kuen-Wang Tsai, Taoyuan (TW);
Chao-Hsi Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/540,704

(22) Filed: Dec. 2, 2021

(65) Prior Publication Data
US 2022/0179287 A1 Jun. 9, 2022

Related U.S. Application Data

(60) Provisional application No. 63/121,415, filed on Dec. 4, 2020.

(51) Int. Cl.
| | |
|---|---|
| *G03B 9/40* | (2021.01) |
| *G01D 5/14* | (2006.01) |
| *H01F 7/16* | (2006.01) |
| *H01F 7/08* | (2006.01) |
| *G02B 7/02* | (2021.01) |
| *G02B 26/08* | (2006.01) |
| *G02B 7/09* | (2021.01) |
| *H04N 23/54* | (2023.01) |
| *H04N 23/55* | (2023.01) |
| *G03B 9/10* | (2021.01) |

(52) U.S. Cl.
CPC .............. *G03B 9/40* (2013.01); *G01D 5/14* (2013.01); *G02B 7/02* (2013.01); *G02B 7/09* (2013.01); *G02B 26/08* (2013.01); *G03B 9/10* (2013.01); *H01F 7/081* (2013.01); *H01F 7/16* (2013.01); *H04N 23/54* (2023.01); *H04N 23/55* (2023.01)

(58) Field of Classification Search
CPC ... G03B 9/40; G03B 9/36; G03B 9/44; G03B 9/10; G03B 9/14
See application file for complete search history.

(56) References Cited

U.S. PATENT DOCUMENTS

| | | | | |
|---|---|---|---|---|
| 2020/0249415 A1* | 8/2020 | Wang | ..................... | G03B 30/00 |
| 2020/0363699 A1* | 11/2020 | Wang | ..................... | H02K 37/04 |

FOREIGN PATENT DOCUMENTS

| | | | | |
|---|---|---|---|---|
| JP | 2013097103 A | * | 5/2013 | |
| JP | 2015125430 A | * | 7/2015 | |

* cited by examiner

*Primary Examiner* — Christopher E Mahoney
(74) *Attorney, Agent, or Firm* — Muncy, Geissler, Olds & Lowe, P.C.

(57) ABSTRACT

An optical element driving mechanism is provided and includes a first movable part, a fixed assembly and a first driving assembly. The first movable part is configured to connect a first optical element. The fixed assembly has a first opening for a light beam to pass through, and the first movable part is movable relative to the fixed assembly. The first driving assembly is configured to drive the first movable part to move relative to the fixed assembly. When the first movable part is located in a first position relative to the fixed assembly, the first optical element overlaps the first opening.

19 Claims, 11 Drawing Sheets

OPTICAL ELEMENT DRIVING MECHANISM

CROSS REFERENCE TO RELATED APPLICATIONS

This application claims the benefit of U.S. Provisional Application No. 63/121,415, filed on Dec. 4, 2020, the entirety of which is incorporated by reference herein.

BACKGROUND OF THE DISCLOSURE

Field of the Disclosure

The present disclosure relates to an optical element driving mechanism, and in particular it relates to an optical element driving mechanism with a shutter structure.

Description of the Related Art

As technology has developed, many of today's electronic devices (such as smartphones) have a camera or video functionality. Using the camera modules disposed on electronic devices, users can operate their electronic devices to capture photographs and record videos.

Today's design of electronic devices continues to follow the trend of miniaturization, meaning that the various components of the camera module or its structure must also be continuously reduced, so as to achieve miniaturization. In general, a driving mechanism in the camera module has a camera lens holder configured to hold a camera lens and a shutter mechanism. However, although the existing driving mechanism can achieve the aforementioned functions of photographing or video recording, they still cannot meet all the needs of the users.

Therefore, how to design a camera module capable of capturing images and capable of achieving miniaturization are topics nowadays that need to be discussed and solved.

BRIEF SUMMARY OF THE DISCLOSURE

Accordingly, one objective of the present disclosure is to provide an optical element driving mechanism to solve the above problems.

According to some embodiments of the disclosure, the present disclosure provides an optical element driving mechanism, which includes a first movable part, a fixed assembly and a first driving assembly. The first movable part is configured to connect a first optical element. The fixed assembly has a first opening for a light beam to pass through, and the first movable part is movable relative to the fixed assembly. The first driving assembly is configured to drive the first movable part to move relative to the fixed assembly. When the first movable portion is located in a first position relative to the fixed assembly, the first optical element overlaps the first opening.

According to some embodiments, when viewed along a main axis, the optical element driving mechanism having a polygonal structure further includes a first side and a second side. The main axis is parallel to a direction of travel of the light beam. The size of the first side is greater than the size of the second side. When viewed along the main axis, the first driving assembly is located on the second side. The winding axis of a first coil of the first driving assembly is parallel to a first axis. The second side is parallel to the first axis.

According to some embodiments, the fixed assembly includes: a base; a protection element, forming a first accommodation space with the base for accommodating the first driving assembly; and an outer frame, forming a second accommodation space with the protection element for accommodating the first optical element. The protection element has a plate-shaped structure.

According to some embodiments, the fixed assembly further includes: a first stopping element, configured to limit a motion range of the first optical element; and a second stopping element, configured to limit the motion range of the first optical element. The first stopping element extends from the base along the main axis. The second stopping element extends from the base along the main axis. The first stopping element passes through the protection element.

According to some embodiments, when the first optical element is located in a first position, the first stopping element is in direct contact with the first optical element. When the first optical element is located in a second position, the second stopping element is in direct contact with the first optical element.

According to some embodiments, the first stopping element is configured to position the first driving assembly. The second stopping element is configured to position the first driving assembly. The outer frame further includes a second opening, corresponding to the first stopping element. The outer frame further includes a third opening, corresponding to the second stopping element.

According to some embodiments, when viewed along the first axis, the outer frame overlaps at least a part of the first stopping element. When viewed along the first axis, the first stopping element overlaps at least a part of the second stopping element. When viewed along the first axis, the first movable part overlaps at least a part of the first stopping element. When viewed along the first axis, the first movable part overlaps at least a part of the second stopping element.

According to some embodiments, the optical element driving mechanism further includes: a first sensing assembly configured to sense movement of the first movable part relative to the fixed assembly; and a control assembly configured to output a first control signal to the first driving assembly according to default information. The first sensing assembly outputs a first sensing signal to the control assembly. The control assembly outputs the first control signal according to the first sensing signal and the default information.

According to some embodiments, the default information includes safe range-of-motion information, which records a safe motion range of the first movable part relative to the fixed assembly. When the first movable part moves within the safe motion range, the first optical element does not directly contact the first stopping element or the second stopping element.

According to some embodiments, the default information further includes: relationship data that records the relationship between the first sensing signal and the position of the first movable part relative to the fixed assembly; third position data, recording that the first movable part is located in a third position; and fourth position data, recording that the first movable part is located in a fourth position. The third position data includes the corresponding first sensing signal when the first movable part is located in the third position. The fourth position data includes the corresponding first sensing signal when the first movable part is located in the fourth position.

According to some embodiments, when the first movable part is located in the first position, the shortest distance between the first optical element and the first stopping element is less than the shortest distance between the first optical element and the first stopping element when the first movable part is located in the third position.

According to some embodiments, when the first movable part is located in the second position, the shortest distance between the first optical element and the second stopping element is less than the shortest distance between the first optical element and the second stopping element when the first movable part is located in the fourth position. The third position data and the fourth position data define the safe range-of-motion information.

According to some embodiments, the first sensing assembly includes a first sensing element, corresponding to a first magnetic element of the first driving assembly. The first magnetic element and the first movable part are integrally formed in one piece. When viewed along the main axis, the first magnetic element is located at a first corner of the optical element driving mechanism. The first magnetic element includes an N pole and an S pole. The first magnetic element includes a junction located between the N pole and the S pole. When the first movable part is located in a preset position, the junction corresponds to the first sensing element.

According to some embodiments, when viewed along a direction perpendicular to the main axis, the first magnetic element overlaps at least a part of the first sensing element.

According to some embodiments, when viewed along the main axis, a first imaginary line passes through the first magnetic element, the first sensing element and the first coil of the first driving assembly.

According to some embodiments, when viewed along the main axis, the first magnetic element overlaps at least a part of the first sensing element. When viewed along the main axis, the first coil of the first driving assembly does not overlap the first sensing element.

According to some embodiments, the optical element driving mechanism further includes: a second movable part, configured to be connected to a second optical element; and a second driving assembly, configured to drive the second movable part to move relative to the fixed assembly. The second movable part is movable relative to the fixed assembly. When the second movable part is located in the first position relative to the fixed assembly, the second optical element overlaps the first opening.

According to some embodiments, when viewed along the main axis, the second driving assembly is located on a third side of the optical element driving mechanism. The size of the first side is greater than the size of the third side. The first side and the third side are not parallel. The third side is parallel to the second side.

According to some embodiments, when viewed along the main axis, a second magnetic element of the second driving assembly is located at a second corner of the optical element driving mechanism. When viewed along the main axis, the first opening is located between the second corner and the first corner. When viewed along the main axis, a connecting line of the first corner and the second corner passes through the first opening.

According to some embodiments, the winding axis of the second coil of the second driving assembly is parallel to the winding axis of the first coil.

The present disclosure provides an optical element driving mechanism, which includes a first movable part, a fixed assembly and a first driving assembly. The first movable part is configured to be connected to the first optical element, and the first driving assembly is configured to drive the first movable part and the first optical element to move relative to the fixed assembly. When the first movable part can be located between the first position and the second position relative to the fixed assembly, the first optical element selectively shields the first opening to achieve the function of the shutter.

In addition, in some embodiments, the optical element driving mechanism may further include a control assembly configured to control the first movable part and the first optical element to move within the safe motion range (between the third position and the fourth position) so as to prevent the first optical element from hitting and damaging the first stopping element or the second stopping element.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1:
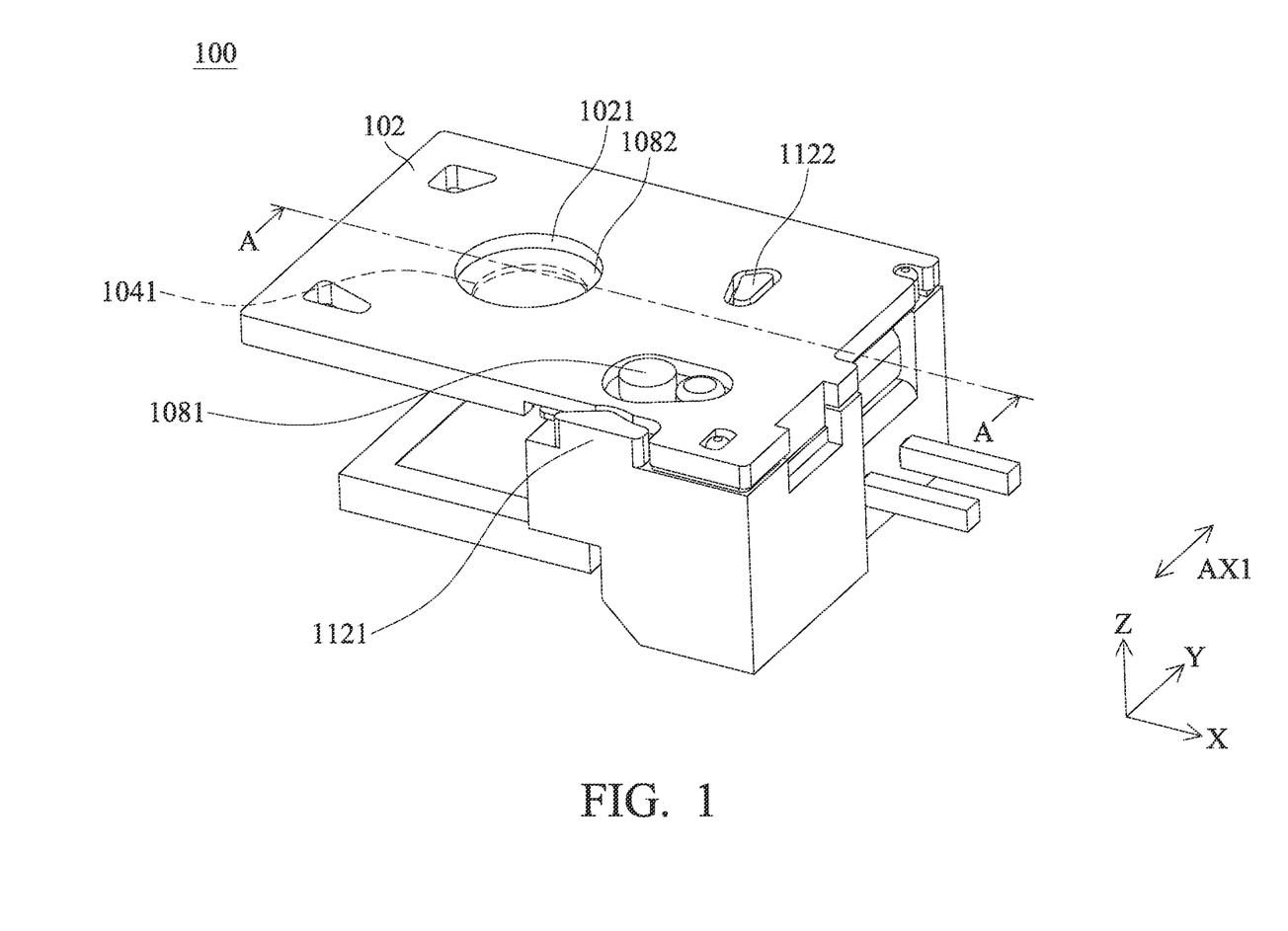
FIG. 1 shows a schematic diagram of an optical element driving mechanism 100 according to an embodiment of the present disclosure.
Figure 2:
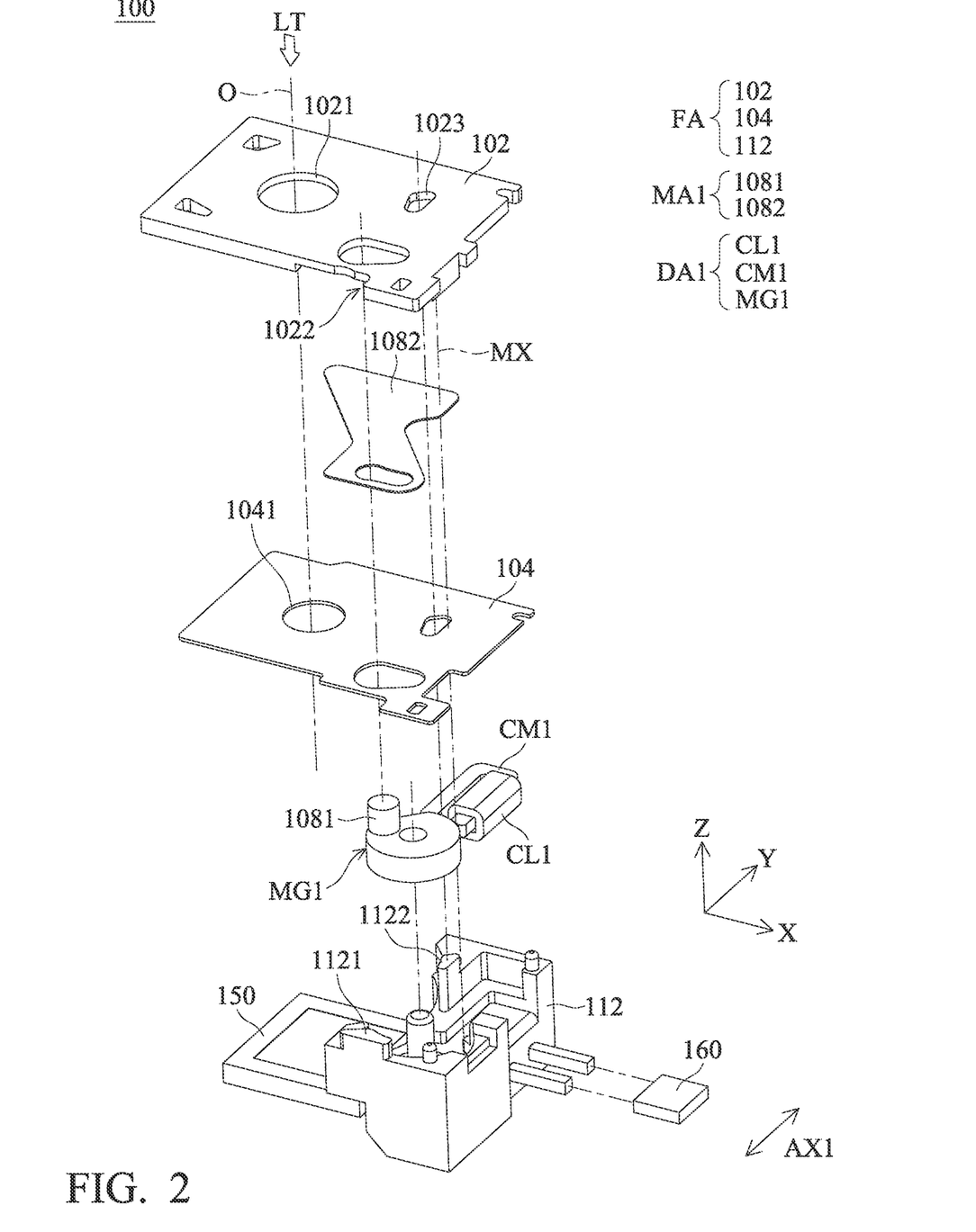
FIG. 2 shows an exploded diagram of the optical element driving mechanism 100 according to the embodiment of the present disclosure.
Figure 3:
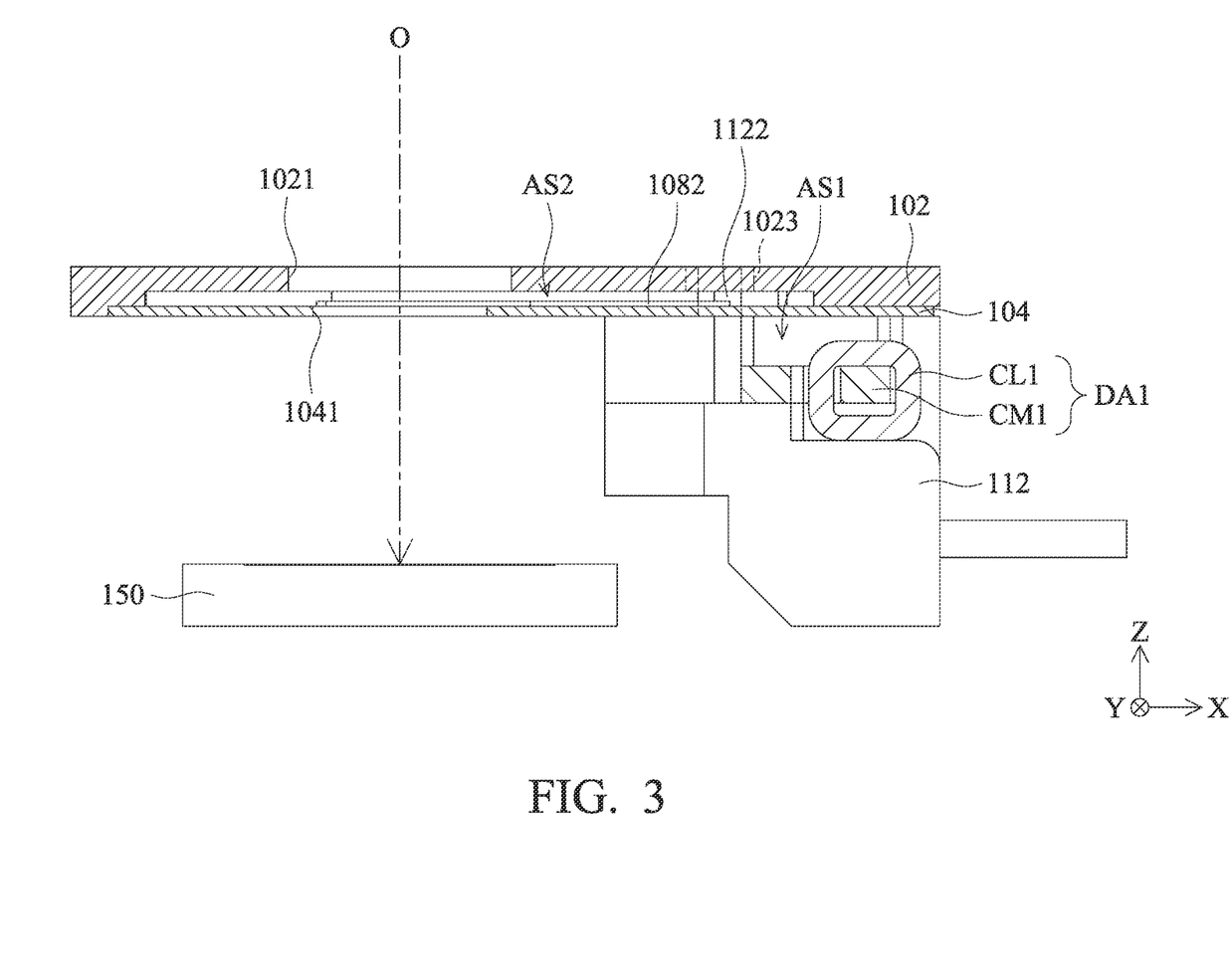
FIG. 3 shows a cross-sectional view of the optical element driving mechanism 100 along line A-A in FIG. 1 according to the embodiment of the present disclosure.

Please refer to FIG. 1 to FIG. 3. FIG. 1 shows a schematic diagram of an optical element driving mechanism 100 according to an embodiment of the present disclosure, FIG. 2 shows an exploded diagram of the optical element driving mechanism 100 according to the embodiment of the present disclosure, and FIG. 3 shows a cross-sectional view of the optical element driving mechanism 100 along line A-A in FIG. 1 according to the embodiment of the present disclosure. The optical element driving mechanism 100 can be an optical camera system and can be configured to hold and drive an optical element. The optical element driving mechanism 100 can be installed in different electronic devices or portable electronic devices, such as a smartphone, for allowing a user to perform an image capturing function.

In this embodiment, the optical element driving mechanism 100 may include a fixed assembly FA, a first movable assembly MA1, and a first driving assembly DA1. The first movable assembly MA1 is movably connected to the fixed assembly FA. The first driving assembly DA1 is configured to drive the first movable assembly MA1 to move relative to the fixed assembly FA.

In this embodiment, as shown in FIG. 2, the fixed assembly FA includes a outer frame 102, a protection element 104 and a base 112. The first movable assembly MA1 may include a first movable part 108 and a first optical element 1082. The outer frame 102 is fixedly disposed on the base 112 to accommodate the first movable assembly MA1 and the first driving assembly DA1, and the protection element 104 is disposed between the outer frame 102 and the base 112.

Specifically, as shown in FIG. 2, the protection element 104 has a plate-shaped structure, and the outer frame 102, the protection element 104 and the base 112 are arranged in order along a main axis MX. As shown in FIG. 3, the protection element 104 and the base 112 form a first accommodation space AS1 for accommodating the first driving assembly DA1. The outer frame 102 and the protection element 104 form a second accommodation space AS2 for accommodating the first optical element 1082.

As shown in FIG. 2 and FIG. 3, the aforementioned outer frame 102 has a first opening 1021, and a photosensitive module 150 is disposed near the base 112. The external light beam LT can travel along an optical axis O and enters a second opening 1041 of the protection element 104 from the first opening 1021 to be received by the aforementioned photosensitive module 150 so as to generate a digital image signal. The main axis MX is parallel to the direction of travel of the light beam LT.

Furthermore, the first movable part 1081 is configured to be connected to the first optical element 1082, and the first movable part 1081 is movable relative to the fixed assembly FA. The first driving assembly DA1 is configured to drive the first movable part 1081 to move relative to the fixed assembly FA. For example, the first driving assembly DA1 is configured to drive the first movable part 1081 and the first optical element 1082 to move relative to the fixed assembly FA.

In this embodiment, the first driving assembly DA1 includes a first coil CL1, a first magnetically conductive element CM1 and a first magnetic element MG1. The first magnetic element MG1 corresponds to the first coil CL1, and the first magnetically conductive element CM1 corresponds to the first coil CL1. For example, the first coil CL1 surrounds the first magnetically conductive element CM1. The first magnetically conductive element CM1 has a U-shaped structure, and the first magnetically conductive element CM1 is perpendicular to a first axis AX1. The first axis AX1 is parallel to the Y axis.

Figure 4:
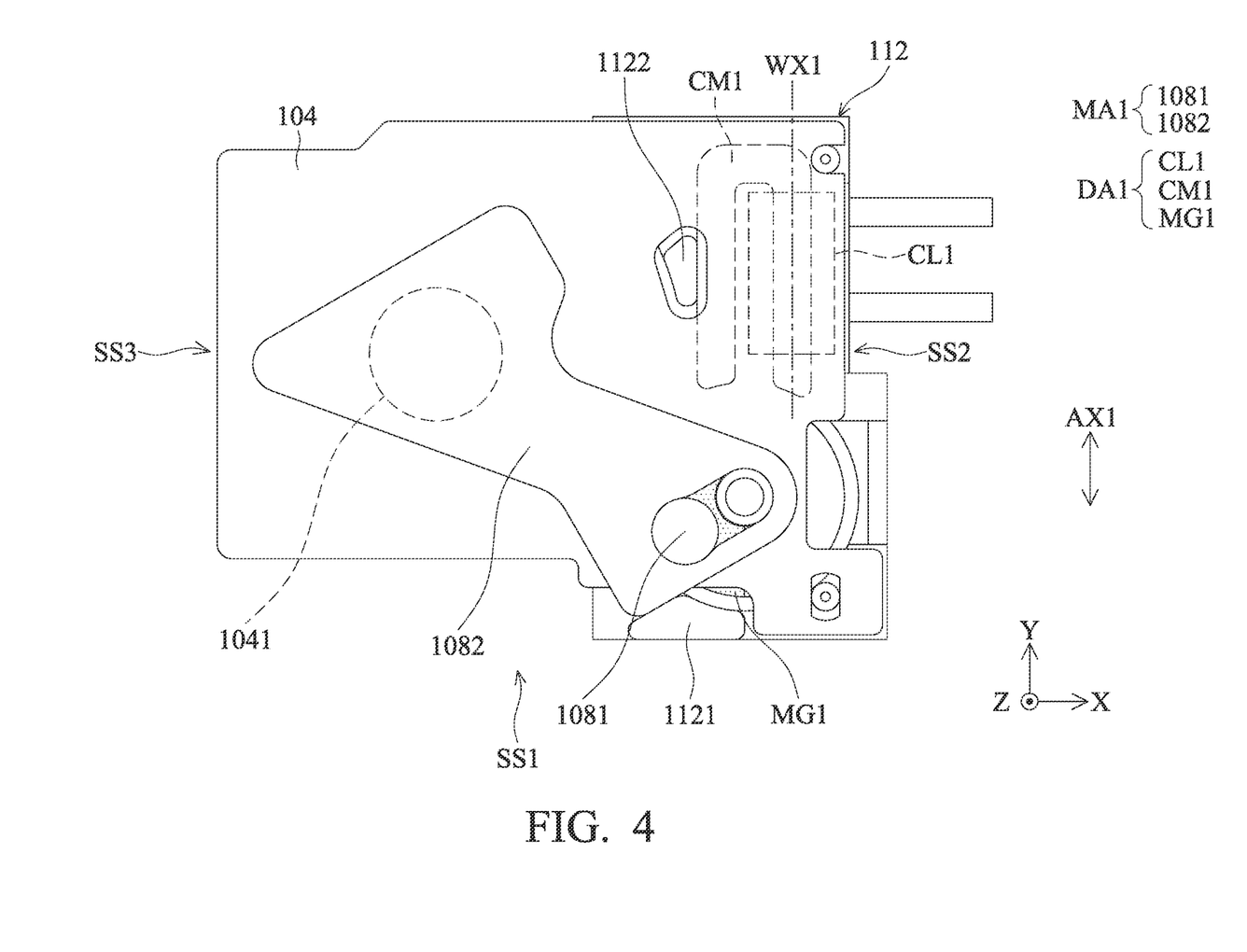
FIG. 4 is a top view of the first movable assembly MA1 in a first position according to an embodiment of the present disclosure.
Figure 5:
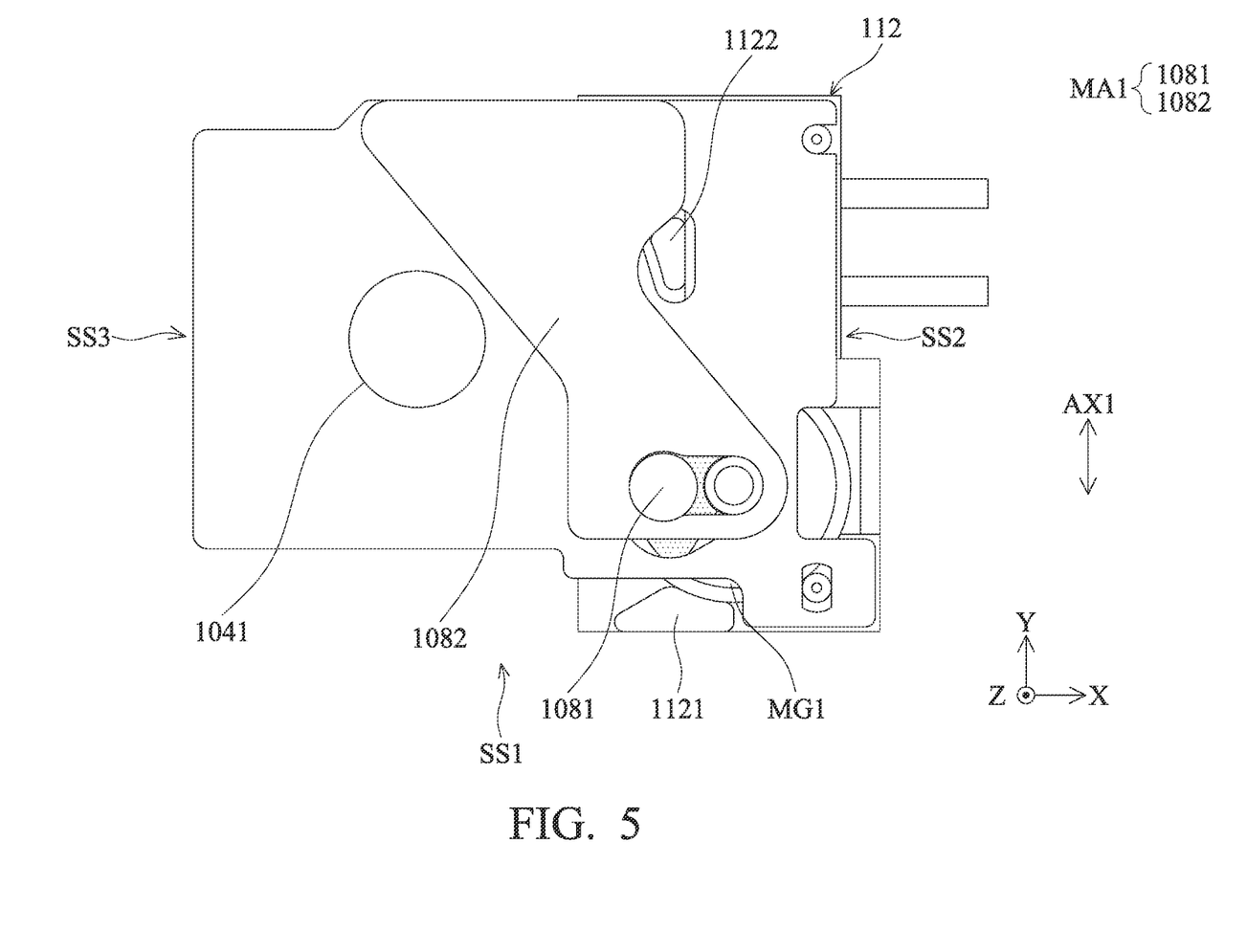
FIG. 5 is a top view of the first movable assembly MA1 in the second position according to an embodiment of the present disclosure.

Please refer to FIG. 1 to FIG. 5. FIG. 4 is a top view of the first movable assembly MA1 in a first position according to an embodiment of the present disclosure, and FIG. 5 is a top view of the first movable assembly MA1 in a second position according to an embodiment of the present disclosure. In this embodiment, as shown in FIG. 1 and FIG. 4, when the first movable part 1081 is located in the first position relative to the fixed assembly FA, the first optical element 1082 overlaps the first opening 1021 and the second opening 1041.

When viewed along the main axis MX (the Z-axis), the optical element driving mechanism 100 having a polygonal structure further includes a first side SS1 and a second side SS2, and the size of the first side SS1 is larger than the size of the second side. The second side SS2 is parallel to the first axis AX1.

When viewed along the main axis MX, the first driving assembly DA1 is located on the second side SS2, and a winding axis WX1 of the first coil CL1 of the first driving assembly DA1 is parallel to the first axis AX1.

Furthermore, the base 112 of the fixed assembly FA may include a first stopping element 1121 and a second stopping element 1122. The first stopping element 1121 is configured to limit the motion range (the range of motion) of the first optical element 1082, and the second stopping element 1122 is configured to limit the motion range of the first optical element 1082.

The first stopping element 1121 is extended from the base 112 along the main axis MX (the Z-axis). The second stopping element 1122 extends from the base 112 along the main axis MX. The second stopping element 1122 passes through the protection element 104.

When the first optical element 1082 is located in the first position (FIG. 4), the first stopping element 1121 is in direct contact with the first optical element 1082. When the first optical element 1082 is located in the second position (FIG. 5), the second stopping element 1122 is in direct contact with the first optical element 1082.

In addition, as shown in FIG. 4, the first stopping element 1121 is configured to position the first magnetic element MG1 of the first driving assembly DA1, and the second stopping element 1122 is configured to position the first magnetically conductive element CM1 of the first driving assembly DA1.

As shown in FIG. 2, the outer frame 102 further includes a second opening 1022 corresponding to the first stopping element 1121. The outer frame 102 may further include a third opening 1023 corresponding to the second stopping element 1122. Specifically, the first stopping element 1121 passes through the second opening 1022, and the second stopping element 1122 passes through the third opening 1023.

As shown in FIG. 1 and FIG. 4, when viewed along the first axis AX1, the outer frame 102 overlaps at least a part of the first stopping element 1121. When viewed along the first axis AX1, the first stopping element 1121 overlaps at least a part of the second stopping element 1122.

When viewed along the first axis AX1, the first movable part 1081 overlaps at least a part of the first stopping element 1121. When viewed along the first axis AX1, the first movable part 1081 overlaps at least a part of the second stopping element 1122.

Figure 6:
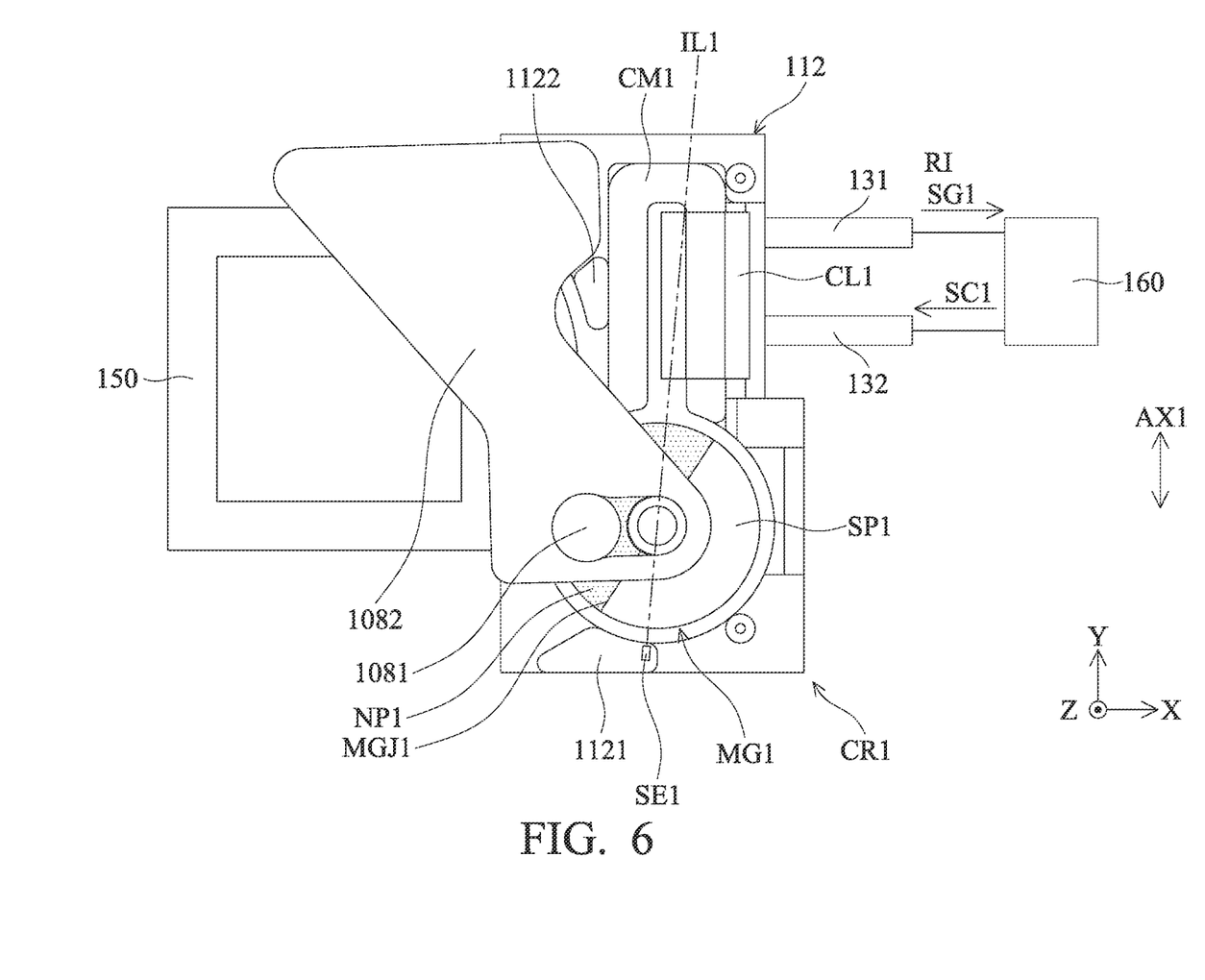
FIG. 6 is a top view of the first optical element 1082 located in a fourth position according to an embodiment of the present disclosure.
Figure 7:
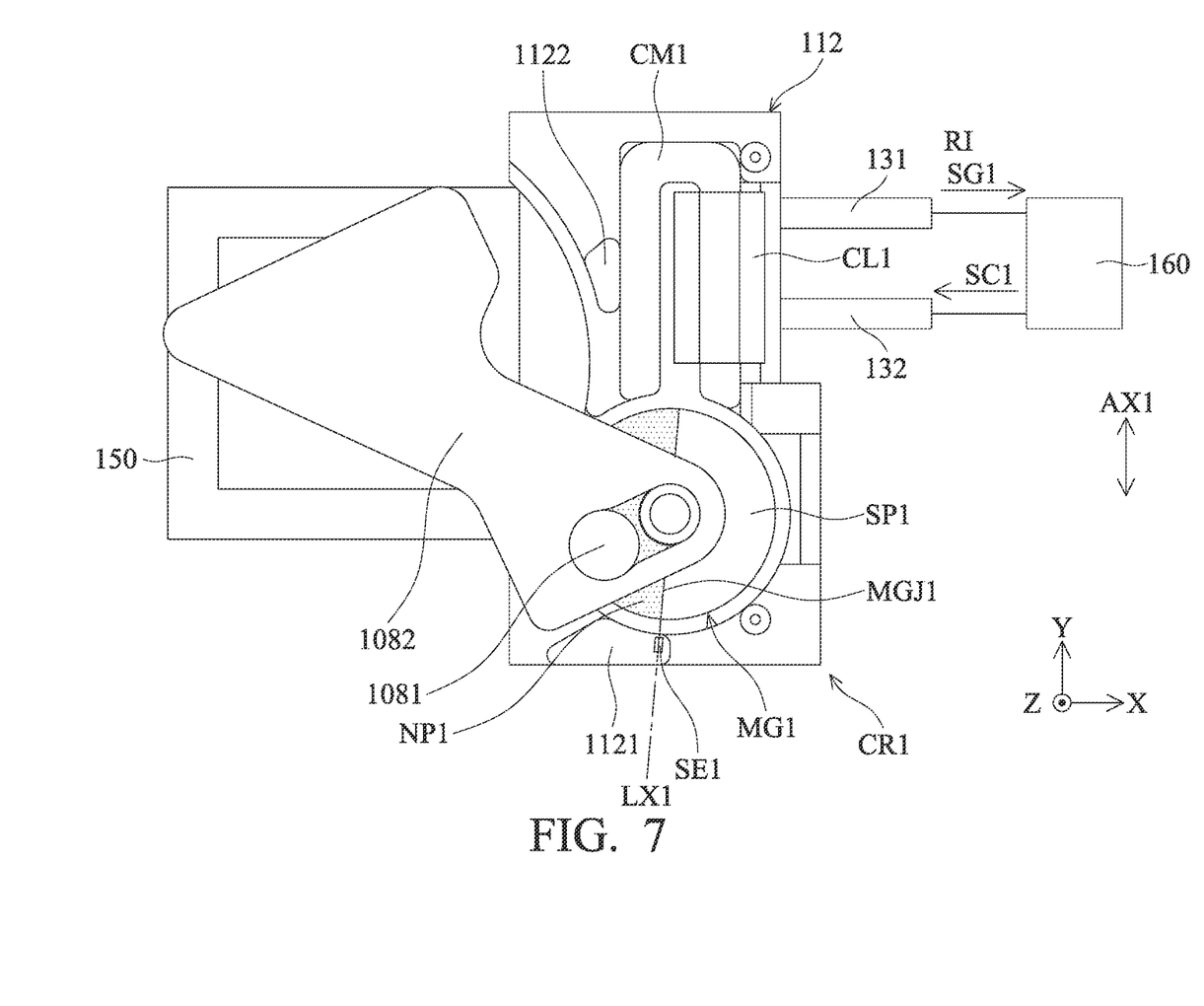
FIG. 7 is top a view of the first optical element 1082 located in a third position according to an embodiment of the present disclosure.

Please refer to FIG. 6 and FIG. 7. FIG. 6 is a top view of the first optical element 1082 located in a fourth position according to an embodiment of the present disclosure, and FIG. 7 is top a view of the first optical element 1082 located in a third position according to an embodiment of the present disclosure. In this embodiment, the optical element driving mechanism 100 may further include a first sensing assembly and a control assembly 160.

The first sensing assembly is configured to sense the movement of the first movable part 1081 and the first optical element 1082 relative to the fixed assembly FA. The control assembly 160 is, for example, a drive chip configured to output a first control signal SC1 to the first driving assembly DA1 according to default information RI. When the first sensing assembly senses the movement of the first movable part 1081 relative to the fixed assembly FA, the first sensing assembly outputs a first sensing signal SG1 to the control assembly 160.

In this embodiment, the first sensing assembly may include a first sensing element SE1 corresponding to the first magnetic element MG1 of the first driving assembly DA1.

It is worth noting that the first magnetic element MG1 and the first movable part 1081 can be integrally formed in one piece. When viewed along the main axis MX, the first magnetic element MG1 is located at a first corner CR1 of the optical element driving mechanism 100.

The first magnetic element MG1 includes an N pole NP1 and an S pole SP1. The first magnetic element MG1 further includes a junction MGJ1 located between N pole NP1 and S pole SP1. As shown in FIG. 7, when the first movable part 1081 is located in a preset position, the junction MGJ1 corresponds to first sensing element SE1. Specifically, at this time, a long axis LX1 of the first sensing element SE1 overlaps the junction MGJ1.

In this embodiment, the preset position is the third position, but it is not limited to this.

In this embodiment, the first sensing element SE1 is embedded in the first stopping element 1121. Furthermore, as shown in FIG. 6, when viewed along a direction perpendicular to the main axis MX, such as viewed along the first axis AX1, the first magnetic element MG1 overlaps at least a part of the first sensing element SE1.

In addition, as shown in FIG. 6, when viewed along the main axis MX, a first imaginary line IL1 passes through the first magnetic element MG1, the first sensing element SE1 and the first coil CL1 of the first driving assembly DA1. For example, the first imaginary line IL1 can overlap the long axis LX1, but it is not limited to this.

Figure 8:
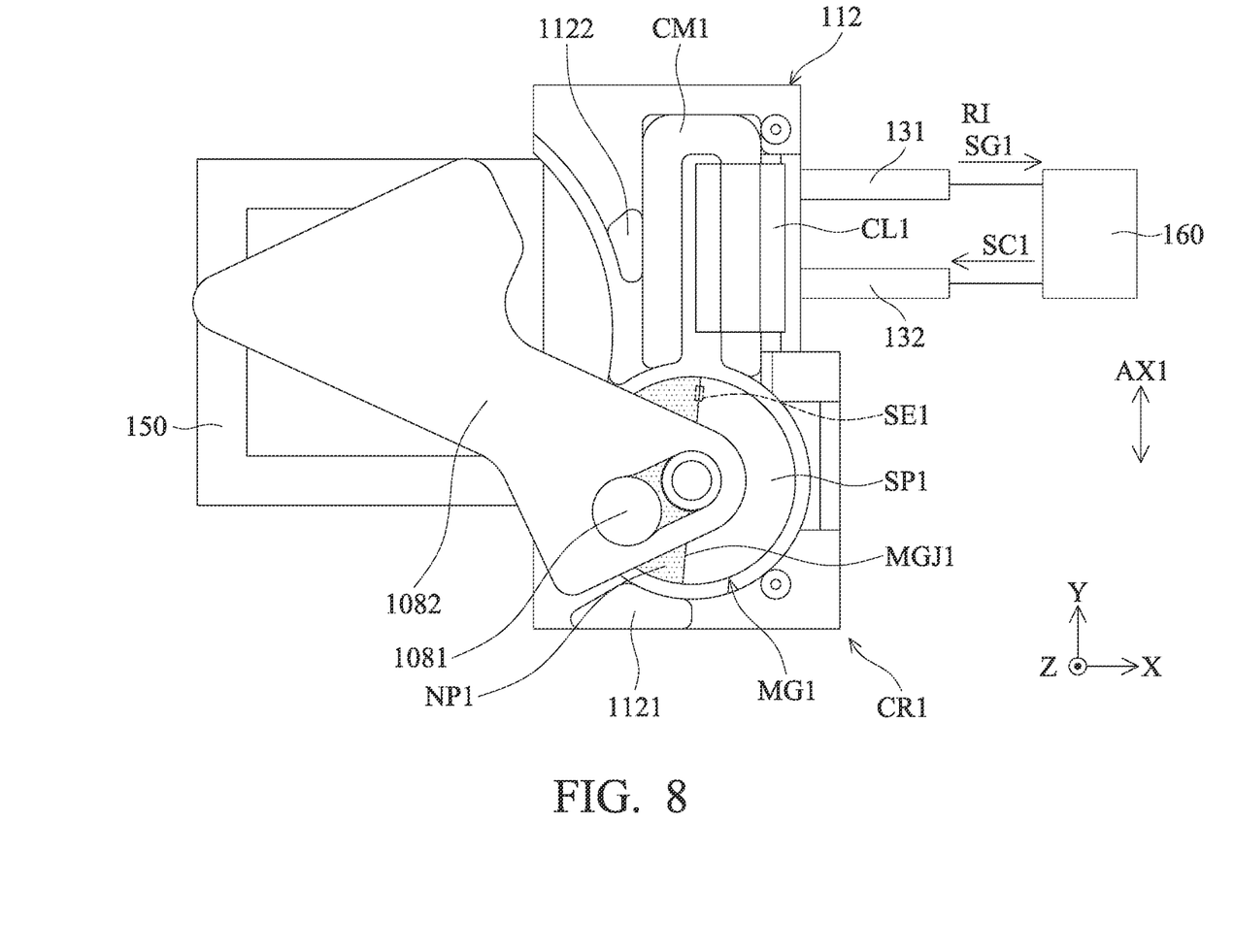
FIG. 8 is a top view of the first optical element 1082 in the preset position according to another embodiment of the present disclosure.

Please refer to FIG. 8, which is a top view of the first optical element 1082 in the preset position according to another embodiment of the present disclosure. In this embodiment, the first sensing element SE1 is disposed close to the first coil CL1. Specifically, the first sensing element SE1 is embedded in the base 112 below the first magnetic element MG1. For example, a groove is formed on the base 112 and located below the bottom of the first magnetic element MG1 (along the Z-axis) to accommodate the first sensing element SE1.

When viewed along the main axis MX, the first magnetic element MG1 overlaps at least a part of the first sensing element SE1. Furthermore, when viewed along the main axis MX, the first coil CL1 of the first driving assembly DA1 does not overlap the first sensing element SE1. Based on this design, the accuracy of the first sensing element SE1 can be improved.

Figure 9:
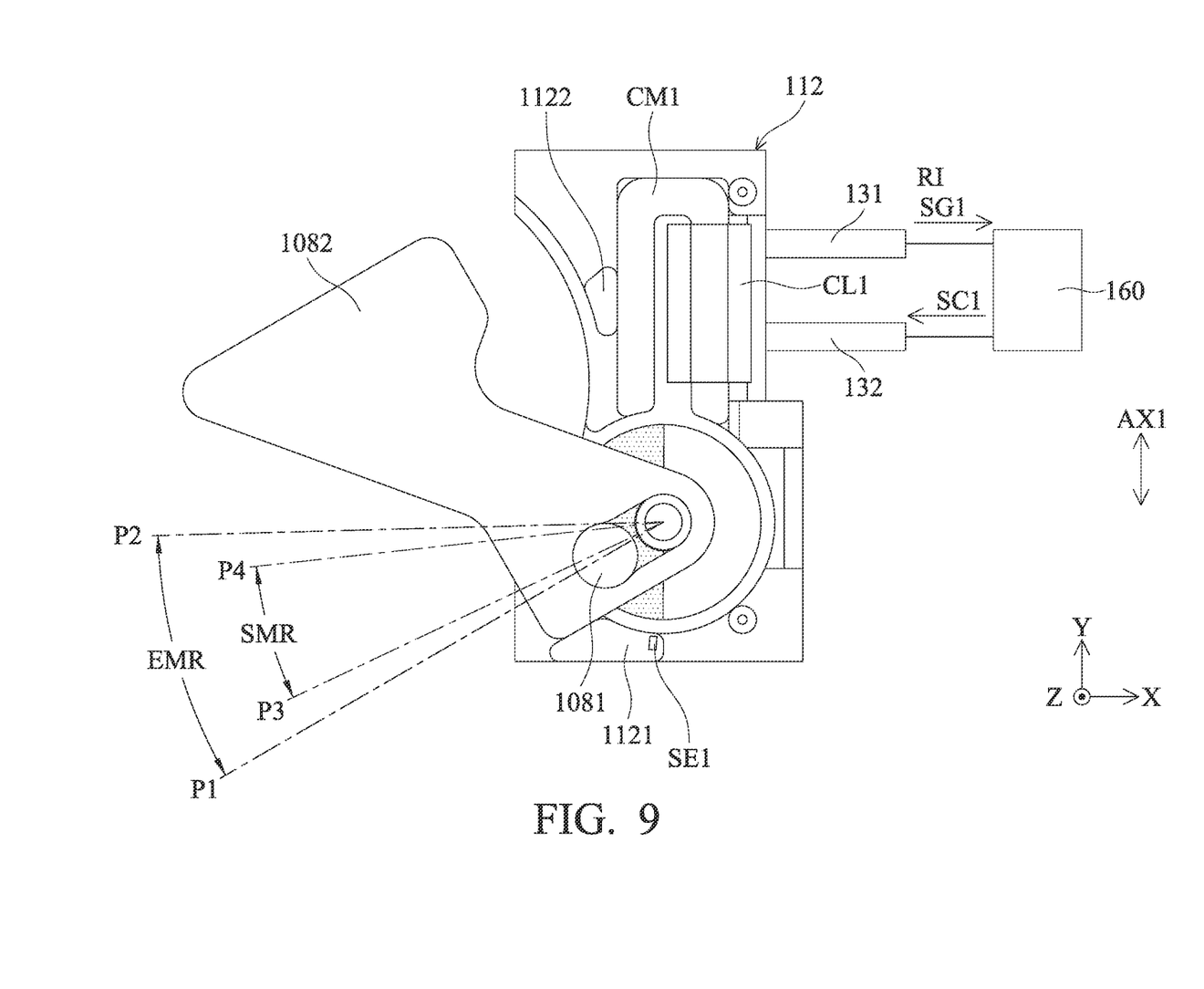
FIG. 9 is a top view of the motion range of the first movable part 1081 according to an embodiment of the present disclosure.

Please refer to FIG. 9, which is a top view of the motion range of the first movable part 1081 according to an embodiment of the present disclosure. The control assembly 160 outputs the first control signal SC1 according to the first sensing signal SG1 and the default information RI. The default information RI includes safe range-of-motion information, which records a safe motion range SMR of the first movable part 1081 relative to the fixed assembly FA. When the first movable part 1081 moves within the safe motion range SMR, the first optical element 1082 does not directly contact the first stopping element 1121 and the second stopping element 1122.

Furthermore, the default information RI further includes relationship data that records a relationship between the first sensing signal SG1 and the position of the first movable part 1081 relative to the fixed assembly FA. For example, the relationship data is a look-up table, which is composed of the position of the first movable part 1081 and the corresponding magnetic field code.

In this embodiment, the relationship data may include third position data, which records that the first movable part 1081 is located in the third position P3 and the corresponding first sensing signal SG1 (a magnetic field code) when the first movable part 1081 is in the third position P3. The relationship data may also include fourth position data, which records that the first movable part 1081 is located in the fourth position P4 and the corresponding first sensing signal SG1 (another magnetic field code) when the first movable part 1081 is in the fourth position P4.

The aforementioned safe range-of-motion information may be defined by the third position data and the fourth position data. That is, the third position P3 and the fourth position P4 can define the aforementioned safe motion range SMR. Furthermore, as shown in FIG. 9, the first position P1 and the second position P2 can define an extreme motion range EMR. The extreme motion range EMR is greater than the safe motion range SMR.

Specifically, when the first movable part 1081 is located in the first position P1, the shortest distance between the first optical element 1082 and the first stopping element 1121 is less than the shortest distance between the first optical element 1082 and the first stopping element 1121 when the first movable part 1081 is located in the third position P3.

When the first movable part 1081 is located in the second position P2, the shortest distance between the first optical element 1082 and the second stopping element 1122 is less than the shortest distance between the first optical element 1082 and the second stopping element 1122 when the first movable part 1081 is located in the fourth position P4.

Based on the above configuration, it can be ensured that the control assembly 160 controls the first movable part 1081 and the first optical element 1082 to move within the safe motion range SMR (between the third position P3 and the fourth position P4), so as to prevent the first optical element 1082 from hitting and damaging the first stopping element 1121 or the second stopping element 1122.

In addition, it should be noted that, in this embodiment, the operation of the control assembly 160 controlling the first movable part 1081 is a closed-loop control, but it is not limited to this. In other embodiments of the present disclosure, the optical element driving mechanism 100 can omit the control assembly 160 to perform an open-loop control.

Figure 10:
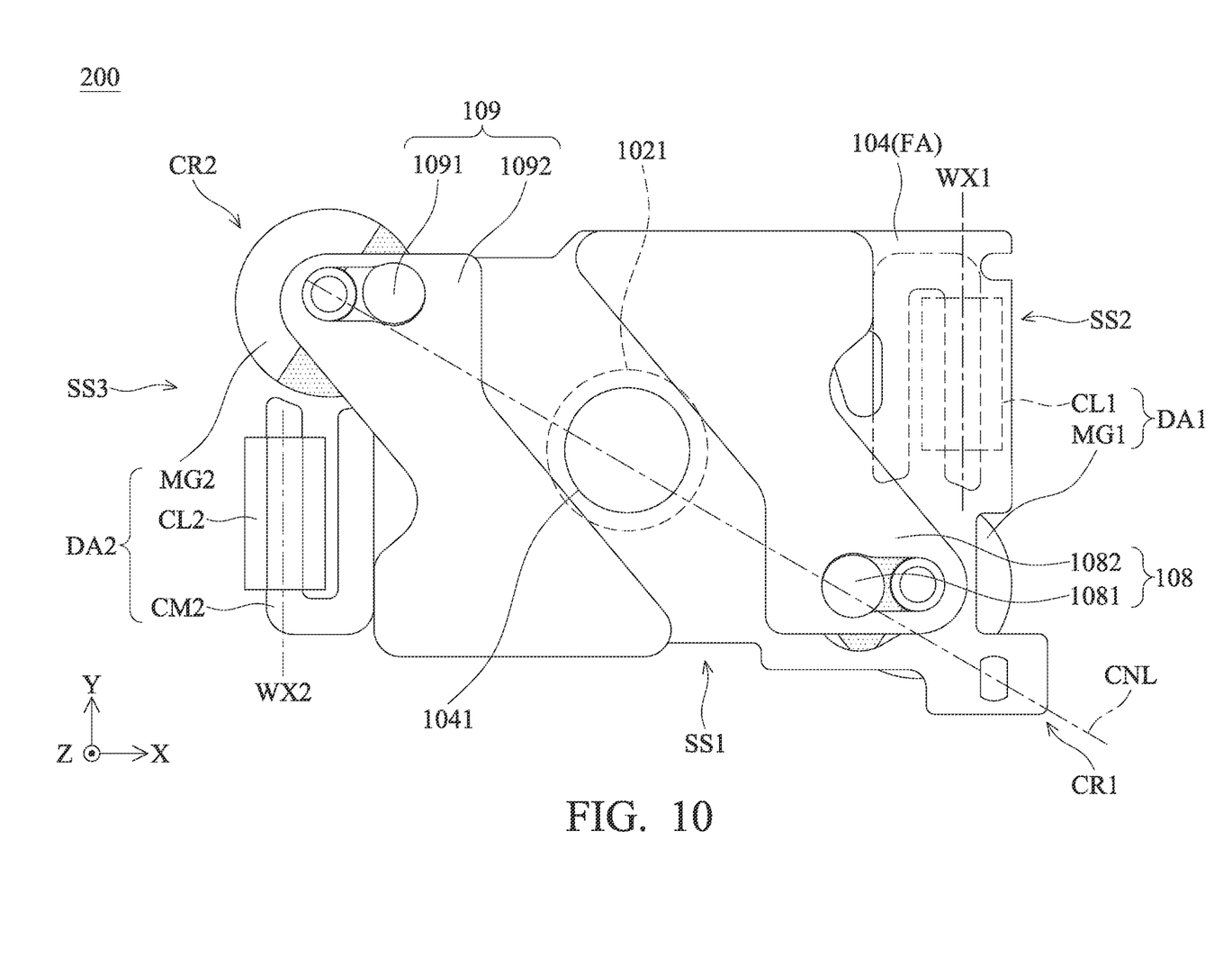
FIG. 10 and FIG. 11 are top views of a partial structure of an optical element driving mechanism 200 according to an embodiment of the present disclosure.
Figure 11:
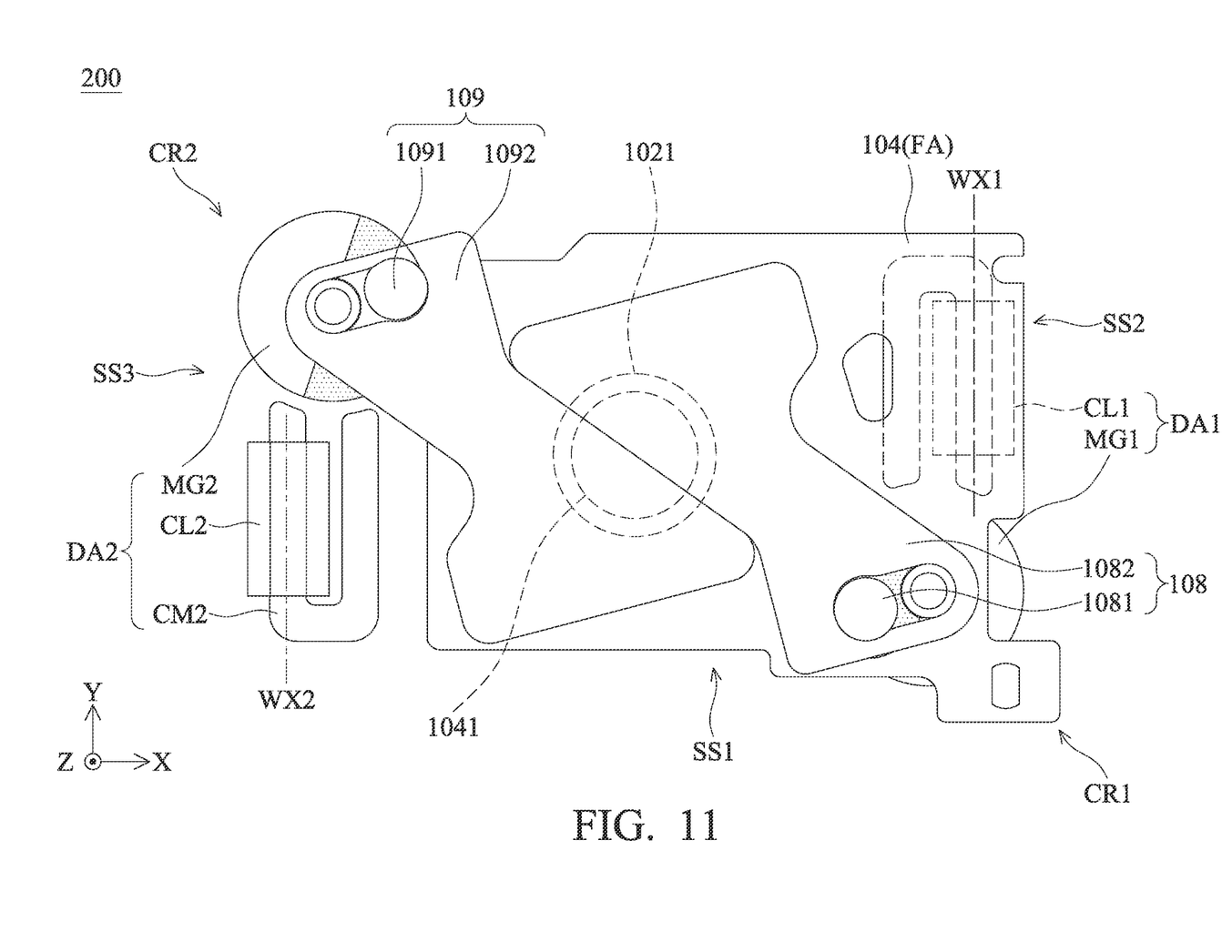

Please refer to FIG. 10 and FIG. 11. FIG. 10 and FIG. 11 are top views of a partial structure of an optical element driving mechanism 200 according to an embodiment of the present disclosure. Compared with the foregoing embodiments, as shown in FIG. 10, the optical element driving mechanism 200 in this embodiment may further include a second movable part 1091 and a second driving assembly DA2. The second movable part 1091 is configured to be connected to a second optical element 1092, and the second movable part 1091 is movable relative to the fixed assembly FA.

The second driving assembly DA2 is configured to drive the second movable part 1091 to move relative to the fixed assembly FA. The second driving assembly DA2 includes a second coil CL2, a second magnetically conductive element CM2 and a second magnetic element MG2. The second magnetic element MG2 corresponds to the second coil CL2, and the second magnetically conductive element CM2 corresponds to the second coil CL2. For example, the second coil CL2 surrounds the second magnetically conductive element CM2. The second magnetically conductive element CM2 has a U-shaped structure.

As shown in FIG. 11, when the first movable part 1081 and the second movable part 1091 are located in the first position relative to the fixed assembly FA, the second optical element 1092 overlaps the first opening 1021 and the second opening 1041, and the first optical element 1082 also overlaps the first opening 1021 and the second opening 1041. When viewed along the main axis MX, the second driving assembly DA2 is located on a third side SS3 of the optical element driving mechanism 200. The size of the first side SS1 is larger than the size of the third side SS3, the first side SS1 and the third side SS3 are not parallel, and the second side SS2 is parallel to the third side SS3.

When viewed along the main axis MX, the second magnetic element MG2 of the second driving assembly DA2 is located at a second corner CR2 of the optical element driving mechanism 200. When viewed along the main axis MX, the first opening 1021 is located between the second corner CR2 and the first corner CR1.

When viewed along the main axis MX, a connecting line CNL of the first corner CR1 and the second corner CR2 passes through the first opening 1021. A winding axis WX2 of the second coil CL2 of the second driving assembly DA2 is parallel to the winding axis WX1 of the first coil CL1, but it is not limited thereto.

Based on the structural configuration of this embodiment, because the moving strokes of the first optical element 1082 and the second optical element 1092 are shorter, the first opening 1021 and the second opening 1041 can be shielded more quickly to achieve the effect of a fast shutter.

The present disclosure provides an optical element driving mechanism 100, which includes a first movable part 1081, a fixed assembly FA and a first driving assembly DA1. The first movable part 1081 is configured to be connected to the first optical element 1082, and the first driving assembly DA1 is configured to drive the first movable part 1081 and the first optical element 1082 to move relative to the fixed assembly FA. When the first movable part 1081 can be located between the first position and the second position relative to the fixed assembly FA, the first optical element 1082 selectively shields the first opening 1021 to achieve the function of the shutter.

In addition, in some embodiments, the optical element driving mechanism 100 may further include a control assembly 160 configured to control the first movable part 1081 and the first optical element 1082 to move within the safe motion range SMR (between the third position P3 and the fourth position P4) so as to prevent the first optical element 1082 from hitting and damaging the first stopping element 1121 or the second stopping element 1122.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a first movable part, configured to be connected to a first optical element;
a fixed assembly, having a first opening for a light beam to pass through, wherein the first movable part is movable relative to the fixed assembly; and
a first driving assembly, configured to drive the first movable part to move relative to the fixed assembly;

wherein when the first movable part is located in a first position relative to the fixed assembly, the first optical element overlaps the first opening;
wherein the fixed assembly comprises an outer frame;
wherein the fixed assembly further comprises:
a first stopping element, configured to limit a motion range of the first optical element; and
a second stopping element, configured to limit the motion range of the first optical element;
wherein when viewed along a first axis, the outer frame overlaps at least a part of the first stopping element;
when viewed along the first axis, the first stopping element overlaps at least a part of the second stopping element;
when viewed along the first axis, the first movable part overlaps at least a part of the first stopping element; and
when viewed along the first axis, the first movable part overlaps at least a part of the second stopping element.

2. The optical element driving mechanism as claimed in claim 1, wherein when viewed along a main axis, the optical element driving mechanism having a polygonal structure further comprises a first side and a second side;
the main axis is parallel to a direction of travel of the light beam;
a size of the first side is greater than a size of the second side;
when viewed along the main axis, the first driving assembly is located on the second side;
a winding axis of a first coil of the first driving assembly is parallel to the first axis;
the second side is parallel to the first axis.

3. The optical element driving mechanism as claimed in claim 2, wherein the fixed assembly comprises:
a base;
a protection element, forming a first accommodation space with the base for accommodating the first driving assembly; and
the outer frame, forming a second accommodation space with the protection element for accommodating the first optical element; and
the protection element has a plate-shaped structure.

4. The optical element driving mechanism as claimed in claim 3, wherein the fixed assembly further comprises:
a first stopping element, configured to limit a motion range of the first optical element; and
a second stopping element, configured to limit the motion range of the first optical element;
the first stopping element extends from the base along the main axis;
the second stopping element extends from the base along the main axis; and
the first stopping element passes through the protection element.

5. The optical element driving mechanism as claimed in claim 4, wherein when the first optical element is located in a first position, the first stopping element is in direct contact with the first optical element;
when the first optical element is located in a second position, the second stopping element is in direct contact with the first optical element.

6. The optical element driving mechanism as claimed in claim 5, wherein the first stopping element is configured to position the first driving assembly;
the second stopping element is configured to position the first driving assembly;
the outer frame further comprises a second opening, corresponding to the first stopping element; and
the outer frame further comprises a third opening, corresponding to the second stopping element.

7. The optical element driving mechanism as claimed in claim 6, wherein the optical element driving mechanism further comprises:
a first sensing assembly configured to sense movement of the first movable part relative to the fixed assembly; and
a control assembly configured to output a first control signal to the first driving assembly according to default information;
wherein the first sensing assembly outputs a first sensing signal to the control assembly; and
the control assembly outputs the first control signal according to the first sensing signal and the default information.

8. The optical element driving mechanism as claimed in claim 7, wherein the default information comprises safe range-of-motion information, which records a safe motion range of the first movable part relative to the fixed assembly;
when the first movable part moves within the safe motion range, the first optical element does not directly contact the first stopping element or the second stopping element.

9. The optical element driving mechanism as claimed in claim 8, wherein the default information further comprises:
relationship data, recording a relationship between the first sensing signal and a position of the first movable part relative to the fixed assembly;
third position data, recording that the first movable part is located in a third position; and
fourth position data, recording that the first movable part is located in a fourth position;
the third position data comprises the corresponding first sensing signal when the first movable part is located in the third position; and
the fourth position data comprises the corresponding first sensing signal when the first movable part is located in the fourth position.

10. The optical element driving mechanism as claimed in claim 9, wherein when the first movable part is located in the first position, a shortest distance between the first optical element and the first stopping element is less than a shortest distance between the first optical element and the first stopping element when the first movable part is located in the third position.

11. The optical element driving mechanism as claimed in claim 10, wherein when the first movable part is located in the second position, a shortest distance between the first optical element and the second stopping element is less than a shortest distance between the first optical element and the second stopping element when the first movable part is located in the fourth position;
the third position data and the fourth position data define the safe range-of-motion information.

12. The optical element driving mechanism as claimed in claim 11, wherein the first sensing assembly comprises a first sensing element, corresponding to a first magnetic element of the first driving assembly;
the first magnetic element and the first movable part are integrally formed in one piece;
when viewed along the main axis, the first magnetic element is located at a first corner of the optical element driving mechanism;
the first magnetic element comprises an N pole and an S pole;
the first magnetic element comprises a junction located between the N pole and the S pole; and
when the first movable part is located in a preset position, the junction corresponds to the first sensing element.

13. The optical element driving mechanism as claimed in claim 12, wherein when viewed along a direction perpendicular to the main axis, the first magnetic element overlaps at least a part of the first sensing element.

14. The optical element driving mechanism as claimed in claim 12, wherein when viewed along the main axis, a first imaginary line passes through the first magnetic element, the first sensing element and the first coil of the first driving assembly.

15. The optical element driving mechanism as claimed in claim 12, wherein when viewed along the main axis, the first magnetic element overlaps at least a part of the first sensing element;
when viewed along the main axis, the first coil of the first driving assembly does not overlap the first sensing element.

16. The optical element driving mechanism as claimed in claim 12, wherein the optical element driving mechanism further comprises:
a second movable part, configured to be connected to a second optical element; and
a second driving assembly, configured to drive the second movable part to move relative to the fixed assembly;
the second movable part is movable relative to the fixed assembly;
when the second movable part is located in the first position relative to the fixed assembly, the second optical element overlaps the first opening.

17. The optical element driving mechanism as claimed in claim 16, wherein when viewed along the main axis, the second driving assembly is located on a third side of the optical element driving mechanism;
the size of the first side is greater than a size of the third side;
the first side and the third side are not parallel; and
the third side is parallel to the second side.

18. The optical element driving mechanism as claimed in claim 17, wherein when viewed along the main axis, a second magnetic element of the second driving assembly is located at a second corner of the optical element driving mechanism;
when viewed along the main axis, the first opening is located between the second corner and the first corner; and
when viewed along the main axis, a connecting line of the first corner and the second corner passes through the first opening.

19. The optical element driving mechanism as claimed in claim 18, wherein a winding axis of a second coil of the second driving assembly is parallel to a winding axis of the first coil.

* * * * *